Patented May 1, 1951

2,550,982

UNITED STATES PATENT OFFICE 2,550,982

FOG INHIBITED HYDROCARBON PRODUCT AND METHOD

William F. Eberz, Altadena, Calif., assignor to Petrolite Corporation, Ltd., Wilmington Del., a corporation of Delaware No Drawing. Application July 12, 1947, Serial No. 760,707

9 Claims. (Cl. 44—70)

My invention relates to a fog-inhibited hydrocarbon product as a composition of matter and to the treatment of hydrocarbon products to eliminate or inhibit "fogs" therein.

The term "fog," as herein used, does not refer to the aerosol type of fog but, rather, to the cloudiness caused by the presence of minute droplets of an aqueous medium suspended in a hydrocarbon product. In the present application the term "hydrocarbon products" is used with reference to transparent or semi-transparent hydrocarbon products, usually but not invariably overhead fractions such as gasoline, kerosene, Diesel fuel, stove oil, gas oil, cleaners' solvent, benzene, toluene, xylene, etc.

Many hydrocarbon products found in commerce contain dissolved water which is precipitable when subjected to reduction in temperature or other changes in equilibrium, resulting in the precipitation of droplets which are visible as a fog. In other instances, hydrocarbon products are encountered which contain such fogs. Such precipitates are detrimental to the value of such products. This is particularly true in the transparent or semi-transparent hydrocarbon oils where such fogs make the oil less desirable and affect the merchantability of the oil. Particular examples of this might be kerosene, gasoline, stove oil, and the like, which are frequently manufactured in the warmer climate of the Gulf Coast States and then shipped and stored in the Northern States with the result that the oils become fogged or cloudy even though originally clear and bright.

This invention in its principal aspects is concerned with the prevention, elimination or suppression of fog due to precipitation of water particles in hydrocarbon products arising from various causes, particularly temperature drop, instability resulting from super-saturation, etc. This objective is accomplished by the use of minute quantities of additives, as hereinafter described. The invention is important in connection with fogs caused by any precipitated aqueous phase or dilute aqueous solution, e. g., a dilute solution of an acid, salt, base or organic compound, as well as pure water. For sake of convenience, any such aqueous media are hereinafter referred to merely as water in view of the fact that it is the aqueous content which gives rise to the problems here solved.

Another important aspect, from the practical standpoint, is the prevention of the precipitation of water from hydrocarbon distillates and other products of conventional refining processes, where there has been prior contact with water. Precipitation may then occur during passage through the colder portions of pipe lines, such aqueous phase frequently being highly corrosive and sometimes separating from the hydrocarbon product to produce pockets in the pipe lines.

All hydrocarbon products do not necessarily produce fogs upon the reductions in temperature often met in commerce, for various reasons. The present invention is concerned with those hydrocarbon products which are susceptible to fogging. The prevention or elimination of fogging is a long-recognized problem of commercial importance, as may be ascertained, among other references, by that to be found in National Petroleum News of January 3, 1945, R-63. Thus, it has been previously proposed to remove the dissolved moisture from these hydrocarbon products by means of solid desiccating agents such as activated alumina, silica gel, etc. These processes are functional but costly in material, operation and maintenance. In many instances the dissolved water has been removed by blowing the hydrocarbon product with dry air. This method is highly objectionable because of loss of valuable volatile components of the hydrocarbon product and because of the introduction of oxygen into the system, leading to oxidative degradation of the product as manifested by damage to color. Other solutions to the problem are characterized by a mechanical approach.

I believe that my invention represents the first practical solution to this problem of inhibiting fog formation, permitting this to be accomplished at a very low cost in materials, equipment and labor, and without any deleterious effect upon the oil itself. This is in contradistinction to all prior proposals, many of which detrimentally modify the hydrocarbon oil. In the present process of prevention of fog formation, the additives are employed in such small amounts as to make the processed oil identical in all other respects with the untreated oil.

The invention is concerned with the presence or potential presence of only those fogs which are visible, these being detectable by visual or light-transmission methods. Suspended water droplets in a hydrocarbon product produce visible fogs only if the droplets are of minute size. Water droplets of large size do not necessarily produce visible fogs and will often settle out on standing. However, upon cooling of a hydrocarbon product containing dissolved water to saturation, at least a portion of the dissolved water will precipitate as a visible fog, the water droplets being of such small size as to remain in suspension for long periods of time, often indefinitely. Droplets of this size give rise to the fogs with which this invention is concerned.

A perfectly clear hydrocarbon product may contain water to saturation at its existing temperature, in which event a cooling of only a few degrees will usually produce an objectionable fog. If such a clear hydrocarbon product does not contain dissolved water to saturation, cooling to the temperature at which it will be saturated will not produce such a fog, but cooling several degrees lower will. If a hydrocarbon product contains such a fog at an existing temperature it is usually evidence that the dissolved water is present to saturation and that more water will precipitate to increase the fog density if the product is cooled below such existing temperature through a given temperature range. The invention contemplates incorporation of a minute quantity of a chemical into the hydrocarbon product to clear such an existing fog and inhibit the hydrocarbon product against fog formation when cooled through such range.

The amount of water which can be dissolved in a hydrocarbon product depends upon the particular product and the temperature thereof. The solubility of water in the lighter petroleum fractions such as gasoline is about .01% at ordinary temperatures. That for the heavier fractions may be considerably less, whereas aromatic hydrocarbons such as benzene may dissolve water to the extent of approximately 0.1%. As to temperature, there is approximately a tenfold increase in solubility for a 100° F. temperature difference. A fog may result from the solubility decrease due to a small temperature drop and may be visible when the precipitated water is only a few thousandths of a per cent. An objectionable fog may appear on a temperature drop of approximately 10° F. or less.

I have found that hydrocarbon products can be protected against fogging upon temperature reduction by subjecting the product to the action of extremely minute amounts of a surface-active agent, also, that by employing somewhat larger, though still minute, amounts of such surface-active agents, existing fogs can be eliminated and the hydrocarbon product protected to the same extent against later fogging upon reduction in temperature. The surface-active agent can be added directly to the hydrocarbon product. However, it is preferable and more convenient to dissolve the surface-active agent in an oil miscible with the hydrocarbon product to form a reagent solution which is then mixed with the hydrocarbon product. The oil is usually a hydrocarbon and its quantity, while not critical, should be minimized. Inclusion of water in the reagent solution should be minimized, it being desirable to use an essentially anhydrous solvent for the surface-active agent.

The surface-active additive may be either anion-active, cation-active, or of the non-ionic type. Surface-active additives generally have present at least one radical containing 10 or more carbon atoms and not more than 64 carbon atoms, per molecule. This is true of the surface-active additives employed in the present instance as a component of the reagent solution above mentioned. The hydrophobe portions of these surface-active additives may be aliphatic, alicyclic, alkylalicyclic, aromatic, arylalkyl, or alkylaromatic. The preferred types of surface-active additives are those in which the molecule contains a long uninterrupted carbon chain containing from 8 to 22 carbon atoms in length.

Examples of suitable anion-active surface-active additives include the common soaps, as well as materials such as sodium cetyl sulphate, ammonium lauryl sulfonate, ammonium di-isopropyl naphthalene sulfonate, sodium oleyl glyceryl sulfate, mahogany and green sulfonates from petroleum or petroleum fractions or extracts, sodium stearamidoethyl sulfonate, dioctyl sodium sulfosuccinate, sodium naphthenate, and the like. As to other suitable sulfonates, see U. S. Patent No. 2,278,171, dated February 17, 1942, to De Groote and Keiser.

Suitable cation-active compounds include cetyl pyridinium chloride, stearamidoethyl pyridinium chloride, trimethyl-heptadecyl ammonium chloride, dimethyl-pentadecyl sulfonium bromide, octadecylamine acetate, 2-heptadecyl-3-diethylene diamino-imidazoline diacetate, etc.

Suitable non-ionic surface-active additives include the oleic acid ester of nonaethylene glycol, diglycol laurate, etc.

It is, of course, well known that surface-active compounds are available, or can be readily prepared, which exhibit the characteristics of more than one of the three above-mentioned types. For instance, reference is made to the type of materials described in U. S. Patent No. 2,262,743, dated November 11, 1941, to De Groote, Keiser and Blair. For convenience, in such instances where a surface-active material may show the characteristics of more than one of the above described types, it is understood that it may be classified under either or both types for the present purpose.

Of the various types of surface-active additives, previously enumerated, it is our preference to use the ionic type as differentiated from the non-ionic type. The ionic type of surface-active additives falls into two distinct classes, cation-active and anion-active, exemplified above. In the anion-active type surface activity is the result of the structure of the negative part of the molecule. Our preference is to use such anion-active type including, among others, salts of high molal carboxylic acids having 8 to 22 carbon atoms, such as higher fatty acids, naphthenic acids, acids obtained by the oxidation of petroleum, etc. Other examples are organic sulfates, such as those obtained by reacting hydroxylated high molal compounds having 8 to 22 carbon atoms with sulfuric acid, followed by neutralization. Such products may be obtained from hydroxylated acids or from alcohols, such as decyl alcohol, lauryl alcohol, etc. The sulfated alcohols may have straight or branched chains. The product employed to neutralize the acid sulfate may be any suitable base so that the salts as such may be sodium, potassium, ammonium salts, or the salts of various amines such as triethanol amine, low molal quaternary ammonium bases, etc.

A simlar type of surface-active additive is obtained from the same sort of raw materials but by the use of phosphoric acid or its equivalent, such as phosphoric anhydride, so as to produce so-called phosphated or phosphorated compounds in which a phosphoric acid radical replaces a sulfuric acid radical. Such phosphated derivatives neutralized with the customary bases are equally suitable.

A class of surface-active additives of the anionic type which is particularly desirable is exemplified by the organic sulfonates. Examples of such sulfonates include, among others, petroleum sulfonates, particularly the mahogany type, dioctyl sodium sulfosuccinate, alkylaryl sulfonic acid salts such as keryl benzene sulfonic acid sodium salt, polypropylated naphthalene sulfonic acid ammonium salt, polybutylated naphthalene sulfonic acid ammonium salts, etc.

It is to be noted that, in addition to the classes previously indicated, certain surface-active additives available in commerce or readily prepared may in essence represent a mixed type of material, as for example, additives obtained by oxyethylation of high molal primary or secondary amines, compounds obtained by the esterification of oxyethylated triethanolamine, compounds obtained by hydroxyethylation of 2-heptadecyl-3-diethylene diamino-imidazoline, etc. Such type represents in essence a mixture of a cation-active and non-ionic type. Similarly, a fatty acid or high molal phenol or alcohol can be subjected to oxyalkylation, and particularly oxyethylation, with a final step in which a terminal hydroxyl radical is subjected to sulfation or phosphation in a manner previously described. Such compound or type of material is characterized by having an anion-active structure in combination with a non-ionic structure. One may also employ a type of material wherein there is a combination of an anion-active radical and a cation-active radical, although my preference is to use such compound where one type predominates over the other. Examples of such combinations include those compounds obtained by the neutralization of high molal acid sulfates, acid phosphates, or high molal sulfonic acids, by means of such compounds as high molal amines, 2-heptadecyl-3-diethylene diamino-imidazoline, etc.

Instead of adding the surface-active agent to the hydrocarbon product as a preformed compound, some desirable surface-active compounds can be formed in situ by reaction between organic acidity of the hydrocarbon product, e. g., naphthenic acids, and a suitable alkali, e. g., sodium hydroxide or ammonia, or, inversely, by reacting in situ an alkali, present in the hydrocarbon product, with an acidic material, as claimed specifically in my copending application Serial No. 760,701, filed July 12, 1947. Many of the salts mentioned above can be formed in situ, such as by reaction with organic acidity present in the oil and/or by separately adding the compound-forming materials to the hydrocarbon product.

As to the optimum amount of the surface-active additive used, no definite amount can be defined as universally usable. The amount will depend on the cost and effectiveness of the surface-active agent in terms of absolute concentration, the amount, if any, of fog already present and which is to be cleared, and the temperature range over which protection to fog formation is desired. As to this last factor, protection over a temperature differential of about 40° F. is usually sufficient commercially, e. g., over a temperature range of about 75° F. to 35° F.

Using this temperature range as a criterion and assuming the use of one of a number of the more effective surface-active agents and assuming that no substantial fog is initially present, I have found that the addition of the surface-active agent in minute amounts varying from as little as one part in 50,000 or even less, to as much as one part in about 2500 is sufficient, ratios or percentages herein expressed on a volume basis. Such amounts, for example, have been found amply sufficient on California Diesel fuels and Gulf Coast furnace oils. If there is initially present in the hydrocarbon product a fog resulting from the precipitation of water due to prior cooling to the existing temperature, this fog can be cleared and some protection given against later fog formation if cooled below the existing temperature by use of the exemplified amounts. In effect, if addition of one part in 6000 to a saturated but essentially fog free hydrocarbon product at 75° F. will protect against fogs with reduction in temperature to 35° F., addition of the same amount to the fogged hydrocarbon product at, say, 60° F. will clear the fog and protect against fogs to a temperature of about 35° F. In this latter instance, if full protection against a 40° F. temperature drop below 60° F. is required, slightly more than one part in 6000 should be used.

Protection to a temperature of about 35° F. is usually sufficient in commerce as the hydrocarbon product at that temperature contains so little dissolved water that further cooling will not produce a significant additional quantity of fog. However, if protection from 100° F. or above down to 35° is desired, the ratios of reagent to oil, given above, should be increased substantially in proportion to the increased solubilities at the higher temperatures.

The surface-active agent can be added to the hydrocarbon product at any existing temperature. However, in treating high-temperature products, e. g., products issuing from distillation equipment at temperatures of 100° F. or higher, it is often preferable to cool the product to some temperature intermediate the highest and the lowest temperatures between which protection against fog is desired and to add the surface-active agent at such intermediate temperature in amount sufficient to clear any fog formed during the cooling and sufficient to protect against fog formation during later cooling to such lowest temperature at which protection is desired.

In the commercial application of the process it is desirable to add the fog suppressant at the lowest convenient temperature. On cooling to this temperature, some of the water precipitated from solution may, in some instances, separate. In this event the fog suppressant need be added only in the amount determined by the fog and dissolved water remaining and not by the entire original water content.

The surface-active agent should be soluble, in the ratios used, in the hydrocarbon product or in the aqueous medium therein. In view of the minute amounts employed in the process, substantially all surface-active agents fulfill this requirement.

The process is not to be confused with dehydration processes where emulsions, usually of crude oil and dispersed brine, are mixed with de-emulsifying agents to destabilize the oil-water interfaces so that coalescence of the dispersed droplets occurs when a controlled agitation brings two droplets into contact. In such processes the coalescence is continued until the coalesced masses are of such size as to gravitate from the oil. In the present process there is no coalescence and separation of the aqueous droplets and the over-all aqueous content of the hydrocarbon product remains the same albeit any existing fog is caused to disappear. The amount of aqueous medium present must not substantially exceed that which the hydrocarbon product can take up after the surface-active agent has been added and at the lowest temperature at which protection is desired. If the hydrocarbon product contains more than such small amount of aqueous medium it should be dehydrated by other methods before applying the process of the present invention. The present process is best suited to hydrocarbon products containing less than a few hundredths of a per cent of aqueous material, dissolved or precipitated, and usually, unless the hydrocarbon product is supersaturated, less than .01% of the aqueous medium or to hydrocarbon products containing water of solubility not substantially in excess of the amount required to saturate the hydrocarbon product at about 150° F. when the surface-active agent is not present.

Furthermore, the present invention is principally effective only upon aqueous droplets of the size of those found in fogs formed upon cooling of a water-saturated oil. If coarser droplets are present, as from moderately strong emulsification of liquid water into the oil, the action of the invention is relatively poor because of the low rate of solution of large drops and because of the probably much larger amounts of water required to be dissolved.

The surface-active agent can be added to the hydrocarbon product in concentrated form or in solution in an essentially anhydrous solvent and injected into a flowing stream of the hydrocarbon product by use of a suitable proportioning means or thoroughly mixed with the hydrocarbon product in a storage tank.

The present invention contemplates a suitable method for predetermining the most desirable kind or class of additives to be used and for predetermining quantitatively the amount to be added to attain the desired objective. The presence of a fog and its comparative density can be determined roughly by visual methods. By the same token, the required amount and character of the additive can be roughly determined by mere visual inspection methods. However, the present invention comprehends more exact testing of such fogs.

Generally speaking, in the preferred visual determination of the necessary amount and best character of reagent to be employed, a sample of the hydrocarbon product, which has been carefully excluded from agitation with air, is introduced into a 4-oz. screw-cap glass bottle so as to fill it within a few tenths of a milliliter of its total capacity. The reagent, usually a dilute solution in oil, is then added in a predetermined amount and the tightly closed bottle immersed in a cooling bath. The bottle is observed periodically until the desired cooling has been attained and the degree of fog formation is then visually observed in diffused daylight. For detection of extremely slight fog formation, the direct rays of the sun are used for the examination. The comparative degree of fog formation can be determined by comparison with a control bottle containing the same hydrocarbon product and which has been subjected to the same treatment except for the addition of the reagent.

Standardized procedures are desirable and the following method, specified in greater detail, has been found well suited to the visual method of determining the potency of various additives: The hydrocarbon product is first saturated with water by shaking a relatively large sample in a bottle with 20% by volume of distilled water at about 75° F. After a few minutes' settling, the water-saturated supernatant hydrocarbon product is poured, with a minimum of agitation, into centrifuge tubes which are completely filled, stoppered and centrifuged until the product is bright. Care is always taken to avoid more than the absolute minimum of exposure to air or agitation since this tends to remove moisture and consequently lowers the amount of fog produced on cooling.

Several 4-oz. screw-cap glass bottles are filled with this saturated hydrocarbon product to within a fraction of a milliliter of capacity. One of these bottles is used as a control but the various chemicals to be tested are added respectively to the remaining bottles, the chemicals being usually added in a suitable solvent, usually a hydrocarbon, by use of a graduated pipet. The chemical and the hydrocarbon product in each bottle are mixed by twirling the bottle, after which the bottle is immersed in a cold bath at about 25° F. The bottles are twirled frequently to assure a uniform temperature throughout their contents. After a period of time, found by previous experience to be sufficient to cool the contents to about 30° F., the bottles are examined in strong northern daylight to detect the extent of fogging which has occurred. If detection of very slight fogging is desired, the bottles are examined in the direct rays of sunlight. The blank or control bottle, subjected to the same cooling but to which no chemical has been added, gives a standard of comparison with untreated hydrocarbon product. Comparison of the various bottles containing the various reagents will indicate the comparative potency of the additives.

If it is desired to determine the minimum amount of a given additive which is required for fog suppression, the sample of the hydrocarbon product is tested directly without presaturation with water. For example, varying amounts of the additive can be mixed with the hydrocarbon product in the various bottles which are then cooled, as above, and visually observed. As before, a control bottle, containing no additive, can be used in the comparison.

The temperatures mentioned above are illustrative of those most commonly encountered in problems of fog prevention. Modifications in the above procedures, suitable to other temperature ranges, will be readily apparent to those skilled in the art.

Even greater accuracy can be obtained by use of photometric measurements in determining the presence or quantity of visible fogs. In a preferred photoelectric method of testing, a metal cell is employed, the cell providing glass windows for the entrance and exit of a beam of light. The intensity of the emergent beam is measured by means of a photoelectric cell. To prevent fogging of the glass windows of this cell because of atmospheric moisture, the windows, light source and photoelectric cell are enclosed in a suitable chamber containing a quantity of desiccant which maintains the interior of the chamber dry. The lower portion of the metal cell may extend into the cold bath.

When using such cells, the sample of the hydrocarbon product is introduced into the cell, agitated by means of a stirrer and the light transmission observed simultaneously with the reading of a thermometer disposed in the cell to indicate the temperature of the hydrocarbon product. The observed percentage of light transmitted by the hydrocarbon product is then plotted against the observed temperature thereof. This photoelectric method permits determination of very small differences in potency between different types of additives.

Using the same photoelectric method, it is desirable to make a comparison run, employing a hydrocarbon product which has been dried by bubbling with nitrogen gas. From this run a characteristic curve of the hydrocarbon product can be plotted, showing the relationship between light transmission and temperature, in the absence of fogs resulting from the precipitation of water from solution. With some hydrocarbon products, the light transmission will vary with temperature due to the precipitation of wax or other materials upon cooling. The characteristic curve avoids the possibility of confusing such precipitants with precipitated moisture.

The following examples of the process are given by way of illustration:

Example 1

In the case of a California light Diesel fuel saturated with water at 75° F. the addition of one part of sodium dioctyl sulfosuccinate to 4,000 parts of the Diesel fuel prevented the formation of any trace of fog when the temperature was reduced to 35° F. The use of one part of this same chemical in 12,000 parts of the water-saturated Diesel fuel led to the formation of only a very slight trace of fog. The addition of one part of chemical to 100,000 parts of the Diesel fuel allowed the formation of a definite fog, but this was nevertheless relatively light compared with the dense fog which was formed when the water-saturated Diesel fuel was cooled to 35° F. without the addition of any fog suppressant.

Example 2

A Stoddard solvent made from California petroleum and water-saturated at 75° F. was found on cooling to 35° F. in a cell of the photoelectric apparatus to reduce the light transmission to 82% of the transmission observed at 75° F., because of the formation of a water fog. When one part of an alkylated naphthalene sulfonate was added to 33,600 parts of the water-saturated Stoddard solvent at 75° F., it was found that on cooling to 35° F. the light transmission was reduced only to 98.5% of that observed at 75° F., showing that no visible fog had been formed. When the alkylated naphthalene sulfonate was added in the ratio of one part to 67,000 parts of the Stoddard solvent, the light transmission at 35° F. was 91% of that at 75° F. This represents a perceptible turbidity, but it is substantially less than that observed in the absence of a fog suppressant.

It will be noted that these examples illustrate the fact that the degree of fog suppression desired may be obtained by the use of the proper concentration of added fog suppressant.

I am aware that compounds of the kind herein contemplated have been added to petroleum products, e. g., lubricating oil, in order to accomplish various results other than the inhibiting of fogs as herein contemplated. For example, I am aware that additives have been incorporated into lubricating oil to contribute a detersive effect, change the emulsifiability of the oil, prevent foaming, depress the pour point, etc. Such addition of additives results in a definite change in one or more of the performance characteristics of the hydrocarbon oil. In the present invention, however, I have found that by using the most effective of the surface-active materials herein mentioned, the amount thereof required to secure the desired fog-suppressing action is so small that such performance characteristics are not appreciably changed. For example, by using the more effective surface-active compounds, the amount required can be in the ratio of 1:10,000 and usually very substantially less and there will be no substantial change in any performance characteristic of the hydrocarbon product albeit the product will be satisfactorily inhibited against fogging.

I claim as my invention:

1. A method of treating those substantially transparent hydrocarbon products containing dissolved water up to saturation and which are susceptible to fogging resulting from the precipitation of dissolved moisture therefrom upon a given change in equilibrium conditions to inhibit such hydrocarbon products against such fogging, which method includes the steps of: dissolving into said hydrocarbon product a surface-active agent in such minute amount as not to change substantially any performance characteristic of the hydrocarbon product while inhibiting same against said fogging, the ratio of surface-active agent to hydrocarbon product being less than about 1:10,000, by volume.

2. A method of preventing the appearance of water-of-solubility fog in a substantially transparent hydrocarbon product containing a dissolved aqueous medium up to saturation when the hydrocarbon product is cooled below its existing temperature and which hydrocarbon product would become thus fogged upon such cooling, which method comprises adding to the hydrocarbon product at such existing temperature a minute amount of a surface-active agent in proportion to about one part in 50,000 to one part in 2500, by volume, for protection against formation of such fog in the hydrocarbon product during a temperature drop of from about 75° F. to about 35° F.

3. A method of clearing a hydrocarbon product of existing fog resulting from the precipitation of a dissolved aqueous medium therefrom, such precipitation occurring upon cooling of the hydrocarbon product while saturated with such dissolved aqueous medium, which method includes the steps of: adding to the fogged hydrocarbon a surface-active agent in minute amount sufficient to clear said hydrocarbon product, the ratio of surface-active agent to hydrocarbon product being in the range of about one part in 50,000 to one part in 2500, by volume.

4. A method of clearing a hydrocarbon product of existing fog, said hydrocarbon product being substantially saturated with a dissolved aqueous medium, and for inhibiting such fog formation when the hydrocarbon product is later cooled and some of the dissolved aqueous medium is otherwise precipitated as fog-forming droplets, which method comprises adding to said fogged hydrocarbon product a minute amount of a surface-active agent, said minute amount being in excess of the amount required to clear the hydrocarbon product of fog, the excess being only sufficient to prevent precipitation of said aqueous medium from solution during later cooling of said hydrocarbon product below the temperature at which said surface-active agent is added, said minute amount being between one part in 50,000 to one part in 2,500, by volume, of the hydrocarbon product.

5. A method of producing fog inhibition in hydrocarbon products which contain a dissolved aqueous medium up to saturation at an existing elevated temperature, which method includes the steps of: cooling the hydrocarbon product to a temperature between such elevated temperature and the lowest temperature to which protection against fog formation is desired; and adding to the thus-cooled hydrocarbon product a minute amount of a surface-active agent sufficient to clear the hydrocarbon product of any residual fog produced by said cooling step and sufficient to inhibit said hydrocarbon product against fog formation when cooled additionally to said lowest temperature at which protection is desired, the amount of said surface-active agent relative to the hydrocarbon product being within the range of about one part in 50,000 to one part in 2,500, by volume.

6. A method as defined in claim 2 in which the surface-active agent is ionic.

7. A method as defined in claim 2 in which the surface-active agent is anion-active.

8. A method as defined in claim 2 in which the surface-active agent is a high molal organic sulfonate.

9. A method of preventing the appearance of a fog in a substantially transparent hydrocarbon product resulting from precipitation of water of solubility when the hydrocarbon product is cooled below an existing temperature, said hydrocarbon product containing water up to saturation, which method includes the steps of: continuously flowing a stream of said hydrocarbon product; and continuously injecting into said flowing stream a minute amount of a surface-active agent.

WILLIAM F. EBERZ.

REFERENCES CITED

The following references are of record in the file of this patent:

UNITED STATES PATENTS

| Number | Name | Date |
| --- | --- | --- |
| 1,614,559 | Kirschbraun | Jan. 18, 1927 |
| 1,614,735 | Kirschbraun | Jan. 18, 1927 |
| 2,316,739 | Cook | Apr. 13, 1943 |